(No Model.)
J. T. BOND.
CULTIVATOR.
No. 324,215. Patented Aug. 11, 1885.
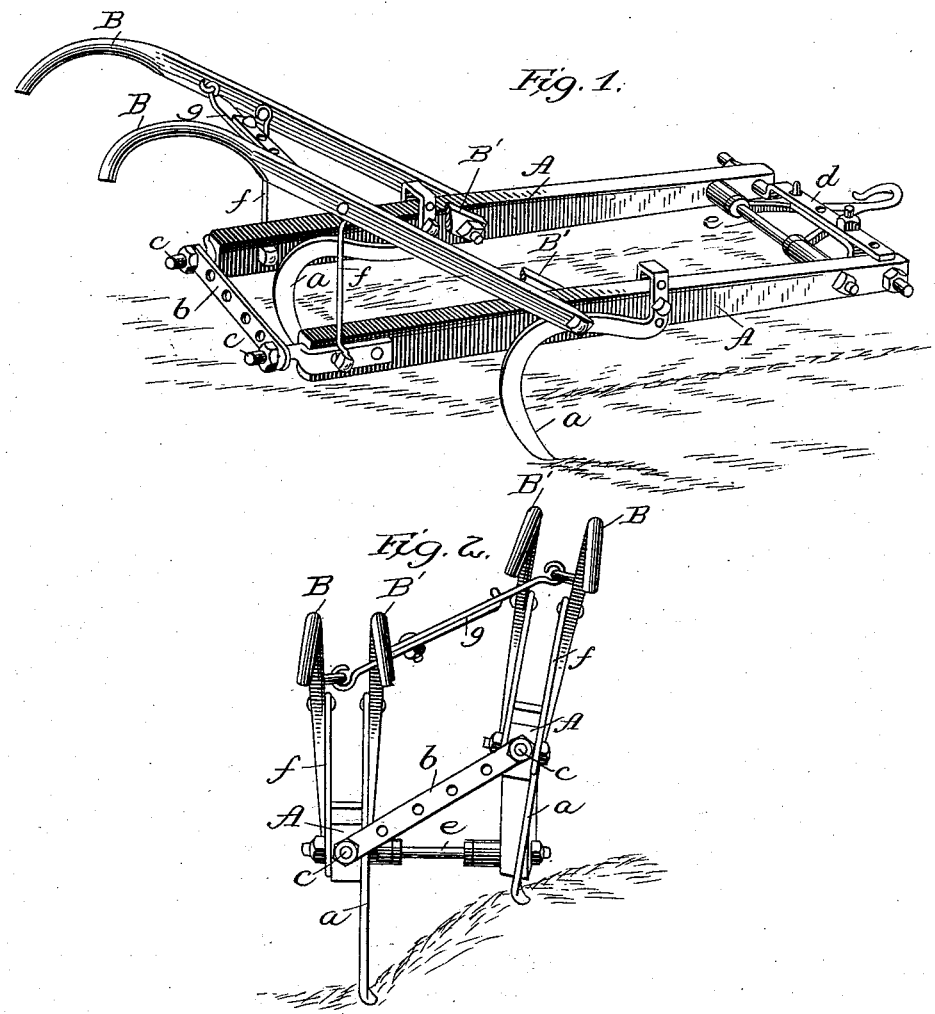
Attest:
Walter Donaldson
F. L. Middleton
Inventor
John T. Bond
by Joyce & Spear
Att'ys

UNITED STATES PATENT OFFICE.

JOHN T. BOND, OF BOND'S MILL, GEORGIA.

CULTIVATOR.

SPECIFICATION forming part of Letters Patent No. 324,215, dated August 11, 1885.

Application filed April 28, 1885. (No model.)

*To all whom it may concern:*

Be it known that I, JOHN T. BOND, of Bond's Mill, in the county of Twiggs and State of Georgia, have invented a new and useful Improvement in Cultivators; and I do hereby declare that the following is a full, clear, and exact description of the same.

My invention relates to cultivators, more particularly to that class used on hillsides and like situations.

The object of the invention is to provide a construction which is cheap and durable, and at the same time particularly applicable to be used on hillsides, rough ground, and the like.

The invention consists in the details of construction hereinafter fully described and specifically claimed.

In the drawings, Figure 1 is a perspective view of my invention. Fig. 2 is a rear view of the same.

In the drawings, A A are the beams, containing the shovels $a$ $a$. These beams are connected at the rear by a bar, $b$, which is perforated and adapted to be supported upon the projections $c$ $c$ at the rear of the beams, being held on by suitable nuts. The bar $b$, being perforated, can be adjusted to any width desired. The front of the beams are connected by a two-part bar, $d$, having suitable bearings in the beams, with the parts held together at the center by a bolt and nut. The inner ends of these parts are provided with holes for any desired amount of adjustment. In the rear of this adjustable bar $d$ is a rod, $e$, extending entirely across between the beams, and held in place by a nut on one end. Washers are placed near the inside of each beam, and between these the clevis or other attachment may be fitted, to which the horse or horses may be connected. From each beam a handle, B, rises to a suitable height, being supported from the rear of the beam by a supporting-link, $f$, as shown. The handles are held together by an adjustable two-part bar, $g$. This bar is held to the handles by eyes turned on the ends of the bar, and staples in the handles on the inside. The bar is held together by a bolt and nut passing through perforations in the two parts. One of the parts has a tongue which fits into an opening in the other part to hold it more securely in place. It will be seen that this construction enables the operator to adjust the plow at all points, and in this way the shovels may be brought close together or moved apart.

The mode of connection at the rear enables the shovels to have an independent vertical movement to a certain extent, and they can thus give when passing over an obstruction in the ground. For this reason, also, the cultivator is especially applicable for side-hill working.

In addition to the handles B supplemental handles B' may be employed, one for each beam, as shown.

When it is desired to use a single shovel, it is only necessary to remove the connections at the front and rear, and by means of the handles B and B' either portion of the cultivator may then be used separately.

Having thus described my invention, what I claim is—

An improved cultivator consisting of two beams carrying suitable shovels, adjustable bars $b$ $d$, connecting the beams at front and rear, respectively, said bars being in line with the said beams, a bar, $e$, at the front for attachment of the clevis, and handles extending upward from the beams, supported thereon by stay-rods $f$, and connected together by an adjustable bar, all substantially as described.

In testimony whereof I have signed my name to this specification in the presence of two subscribing witnesses.

JOHN T. BOND.

Witnesses:
JAMES B. SOLOMON,
JOHN B. BOND.